(12) United States Patent
Bell et al.

(10) Patent No.: US 9,217,864 B2
(45) Date of Patent: Dec. 22, 2015

(54) AUTOMATIC CAMERA LENS CLEANING SYSTEM

(71) Applicants: Richard Bell, Fort Mill, SC (US);
Rebecca Bell, Fort Mill, SC (US)

(72) Inventors: Richard Bell, Fort Mill, SC (US);
Rebecca Bell, Fort Mill, SC (US)

(*) Notice: Subject to any disclaimer, the term of this patent is extended or adjusted under 35 U.S.C. 154(b) by 0 days.

(21) Appl. No.: 14/571,740

(22) Filed: Dec. 16, 2014

(65) Prior Publication Data
US 2015/0277111 A1 Oct. 1, 2015

Related U.S. Application Data

(60) Provisional application No. 61/971,603, filed on Mar. 28, 2014.

(51) Int. Cl.
| G02B 1/00 | (2006.01) |
| G02B 27/00 | (2006.01) |
| G03B 17/12 | (2006.01) |

(52) U.S. Cl.
CPC ............ *G02B 27/0006* (2013.01); *G03B 17/12* (2013.01)

(58) Field of Classification Search
CPC ............... B60S 1/50; B60S 1/52; B60S 1/56; B60S 1/0848; B60S 1/00; H04N 5/2171; H04N 5/2252; G02B 27/0006; G02B 17/12

USPC ........................................................ 359/509
See application file for complete search history.

(56) References Cited

U.S. PATENT DOCUMENTS

| 5,097,563 A | 3/1992 | Cowan |
| 5,140,719 A | 8/1992 | Cowan |
| 5,868,867 A | 2/1999 | Clukey |
| 6,135,874 A | 10/2000 | Weber |
| 7,080,872 B1 | 7/2006 | Simonowits |
| 2011/0165831 A1 | 7/2011 | Wang |
| 2015/0166021 A1* | 6/2015 | Gokan .................... B60S 1/52 134/102.2 |

* cited by examiner

*Primary Examiner* — Euncha Cherry
(74) *Attorney, Agent, or Firm* — Daniel Boudwin; Global Intellectual Property Agency LLC

(57) ABSTRACT

Disclosed is an automatic camera lens cleaning system. In one embodiment, the present invention includes a blower assembly having a housing with a camera secured thereto. The camera lens of the camera is encircled in an annular member having a plurality of apertures thereon, wherein the apertures are in air communication the interior volume of the housing and a tube connected thereto. The tube is in air communication with an air compressor pump, which is driven by engine or an electronic solenoid and actuated by a central processing unit (CPU) or the like. The air compressor pump can force air through the apertures so as to clean the camera lens. The CPU is adapted to actuate the air compressor pump when the vehicle transmission is set in reverse, when there is debris on the camera lens, and/or when the camera is initiated through a user interface.

9 Claims, 2 Drawing Sheets

AUTOMATIC CAMERA LENS CLEANING SYSTEM

CROSS REFERENCE TO RELATED APPLICATION

This application claims the benefit of U.S. Provisional Application No. 61/971,603 filed on Mar. 28, 2014. The above identified patent application is herein incorporated by reference in its entirety to provide continuity of disclosure.

BACKGROUND OF THE INVENTION

1. Field of the Invention

The present invention relates to a camera lens cleaning system. More specifically, the present invention pertains to an improved automatic camera lens cleaning system for rear view cameras on vehicles. The present system comprises an annular member with apertures for blowing air therethrough. The air is directed toward a camera lens at high velocity to remove any debris thereon.

Many vehicles include a rear view camera or a backup camera to aid the driver in driving reverse, and to alleviate the rear blind spot. Rear view cameras are designed to avoid a backup collision, and are common on vehicles that tow large trailers, such as motorhomes. Generally, the cameras are attached to the rear of a vehicle, and close to the ground. Thus, the camera lens can become easily dirty and difficult to see through.

Dirty camera lenses can be problematic because they obstruct the driver's view and prevent the driver from seeing the rear blind spots or other parts of the road behind the vehicle. Thus, drivers must ensure that the camera lens is clean so that they have a clear view of the area behind the vehicle and that they avoid causing an accident. The camera lens can become dirty while the driver is operating the vehicle, however. Thus, the driver must stop operating the vehicle to clean the camera lens, which can be inconvenient, time consuming, and impracticable. Therefore, a means for automatically cleaning a camera lens of a rear view camera to increase vehicle safety is desired.

The present invention provides a camera lens cleaning system for vehicles. The present invention may be retrofitted for use with existing vehicle cameras, and preferably rear view cameras. The present invention comprises a blower assembly having a housing that is adapted to hold a camera therein. The camera is secured to the housing so that the camera lens is disposed on the exterior of the housing and the remaining portion of the camera is imbedded within the interior volume housing. The housing further comprises an annular member that is adapted to encircle the camera lens at the exterior of the housing. The annular member comprises a plurality of apertures thereon, wherein the apertures are in air communication the interior volume of the housing and a tube connected thereto.

The tube is also connected to an air compressor pump, which is driven by a vehicle's engine or an electronic solenoid and actuated by a vehicle's CPU, pulse-code modulation (PCM), electronic control module (ECM), transmission control module (TCM), or the like. The CPU/PCM/ECM/TCM is in electrical communication with a gear shift control unit that can detect whether a vehicle is in reverse, a sensor that can detect presence of debris on the camera lens, and a user interface that is able to control the air compressor pump when the camera is initiated. When the air compressor pump is actuated, it forces air through the tube so that the air can escape through the apertures. The apertures are preferably angled towards the camera lens so that the blown air hits the surface of the camera lens and clears any debris thereon.

The primary advantage of the present invention is that the present invention increases the safety of the vehicle operation by providing a means of automatically cleaning the camera lens while the driver is operating the vehicle. Thus, the driver need not stop operating the vehicle and exit the vehicle to clean the camera lens from the exterior of the vehicle. Additionally, the present invention provides a camera cleaning system that can be used with existing rear view camera of a vehicle, as well as the gear shift control unit and the sensor that are installed by the vehicle manufacturers.

2. Description of the Prior Art

Devices have been disclosed in the prior art that relate to air distribution devices for use on vehicles. These include devices that have been patented and published in patent application publications. Some of these devices disclose an air blowing device that is adapted for delivering air flow onto the back windshield of an automobile, whereby the air blower is controlled by a control circuit. Other devices disclose a device that can provide air flow over the side mirrors of a vehicle in order to clean the windshield of a vehicle. These devices, however, do not disclose an air blowing device for clearing debris from a rear view camera lens that is installed on a vehicle. The foregoing is a list of devices deemed most relevant to the present disclosure, which are herein described for the purposes of highlighting and differentiating the unique aspects of the present invention, and further highlighting the drawbacks existing in the prior art.

Specifically, U.S. Published Patent Application No. 2011/0165831 to Wang discloses an air blowing device for back windshield of vehicles. The device comprises a control circuit, an air compressor, an air duct, and an air nozzle. The control circuit is adapted to control the air compressor, which is in air communication with the air nozzle and the air duct. Wang, however, is directed toward an air blowing device for windshields, and does not disclose an air blowing device for a camera lens. The present invention comprises an annular member having a plurality of apertures for blowing air therethrough. The cover is disposed around the camera lens, thereby allowing the blown air to be directed theretowards.

Similarly, U.S. Pat. No. 5,140,719 to Cowan discloses a vehicle window cleaning device comprising high speed blowers that are powered via batteries of the vehicle. The blowers are designed to replace conventional windshield wipers on vehicle. The blowers are disposed on the front windshield and side view mirrors of the vehicle. Thus, Cowan does not disclose an air blower to clean camera lens of a rear view camera that is disposed on the back portion of the vehicle.

U.S. Pat. No. 6,135,874 to Weber discloses a ventilation device for a side window of a motor vehicle. The device comprises an air guide channel that is located in a vehicle door. The air guide channel contains air outlets so as to allow the air to ventilate therefrom. Thus, Weber discloses a ventilation device, and not an air blower. The present invention comprises an air blower for clearing debris or moisture from a camera lens.

U.S. Pat. No. 5,097,563 to Cowan discloses a vehicle window cleaning device, wherein the device is adapted to replace windshield wipers of the vehicle. The device includes a housing having an electrically powered blower and heater. The housing is ducted to air nozzles and disposed along the bottom edge of a windshield. Thus, Cowan does not disclose a blower that comprises an annular member that is adapted to be fit around a camera lens, wherein the annular member comprises a plurality of apertures for blowing air therethrough.

U.S. Pat. No. 5,868,867 to Clukey discloses a device that removes moisture from a side view mirror and adjacent side windows of a vehicle, wherein the device utilizes the air flow to prevent the buildup of moisture. In one embodiment, the device redirects the air flow past the mirror and side window surfaces. The device comprises a housing with multiple channels thereon, wherein the channels are disposed at an angle to redirect air flow. The housing may be attached along the lower portion of the mirror and the windows so that it does not obstruct the user's views. In contrast, the present invention comprises an annular member having a plurality of apertures thereon. The apertures are in air communication with a tube that is connected to an air compressor pump, which drives the air through the tube and out of the apertures.

Finally, U.S. Pat. No. 7,080,872 to Simonowits discloses a windshield clearing system that is adapted to replace existing wipers on a vehicle. The clearing system includes an air source assembly that is coupled to the vehicle on which it is installed, a blower assembly, and a suction assembly for removing debris from the windshield. The blower assembly is substantially rectangular in shape and is disposed on the hood of the vehicle. In contrast, the present invention discloses an air blower that is annular in shape. Additionally, the present invention is configured to be installed around a camera lens.

The devices disclosed in the prior art have several known drawbacks. The foregoing devices are directed towards blower assemblies for clearing vehicle windshields. Thus, the blower assemblies disclosed in the prior art are generally rectangular or elongated in shape. In contrast, the present invention comprises an automatic camera lens cleaning system that includes an annular member that is configured to be installed around a camera lens. The annular member comprises a plurality of apertures thereon, wherein the apertures are in air communication with a tube that is connected to an air compressor pump. The air compressor pump is driven by the engine or the electronic solenoid of a vehicle, so as to provide blow air through the apertures at a high pressure.

It is therefore submitted that the present invention is substantially divergent in design elements from the prior art, and consequently it is clear that there is a need in the art for an improvement to air distribution devices for use on vehicles. In this regard, the instant invention substantially fulfills these needs.

SUMMARY OF THE INVENTION

In view of the foregoing disadvantages inherent in the known types of air distribution devices for use on vehicles now present in the prior art, the present invention provides a new and improved automatic camera lens cleaning system wherein the same can be utilized for clearing obstructions from a rear view camera lens.

It is therefore an object of the invention to provide a new and improved automatic camera lens cleaning system that has all of the advantages of the prior art and none of the disadvantages.

Another object of the present invention is to provide a new and improved automatic camera lens cleaning system comprising an air compressor pump that is driven by a vehicle engine or an electronic solenoid.

Yet another object of the present invention is to provide a new and improved automatic camera lens cleaning system comprising a central processing unit that is in electrical communication with a gear shift control unit, a user interface, and a sensor to operate the air compressor pump.

Still yet another object of the present invention is to provide a new and improved automatic camera lens cleaning system comprising an annular member having a plurality of apertures for blowing air therethrough, wherein the annular member is adapted to be installed around a camera lens of a vehicle.

Still yet another object of the present invention is to provide a new and improved automatic camera lens cleaning system that is automatically actuated when the vehicle is in reverse gear, a rear view camera is initiated, and/or debris or moisture is detected on the camera lens.

Still yet another object of the present invention is to provide a new and improved automatic camera lens cleaning system wherein the device may be readily fabricated from materials that permit relative economy and are commensurate with durability.

Other objects, features, and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein the numeral annotations are provided throughout.

DETAILED DESCRIPTION OF THE INVENTION

Figure 1:
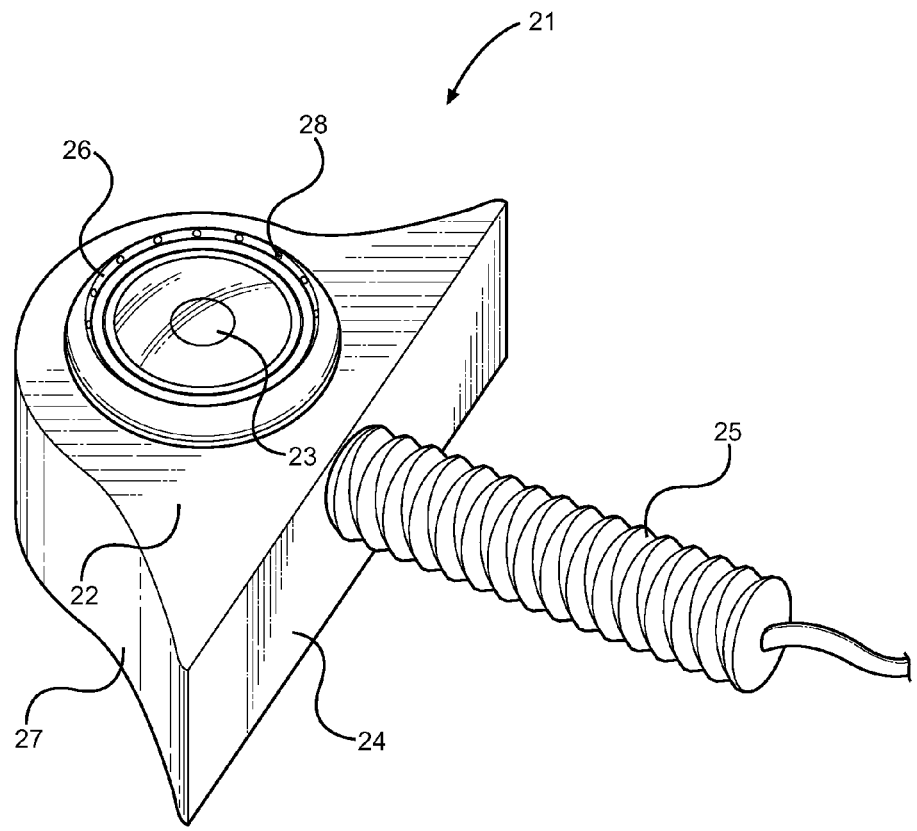
FIG. 1 shows a perspective view of the air blower assembly of the present invention.

References are made herein to the attached drawings. Like reference numerals are used throughout the drawings to depict like or similar elements of the automatic camera lens cleaning system. For the purposes of presenting a brief and clear description of the present invention, the preferred embodiment will be discussed as used to clear obstructions from a rear view camera lens. The figures are intended for representative purposes only and should not be considered to be limiting in any respect.

Referring now to FIG. 1, there is shown a perspective view of the air blower assembly of the present invention. In the exemplary embodiment of the present invention, the blower assembly 21 comprises a housing 27 having a front wall 22, a back wall, a top wall, and a bottom wall 24, defining an interior volume. The interior volume of the housing 27 is adapted to hold a camera and related circuitry therein. The present invention may be used with an existing camera that is installed on a vehicle, or a new camera that is imbedded in the housing 27. Preferably, the camera may comprise a rear view camera for a vehicle.

The camera comprises a camera lens 23 disposed on the exterior of the housing 27 at the front wall 22 thereof. Thus, the front wall 22 of the housing 27 comprises an opening through which the camera lens 23 is visible. The wires from the circuitry of the camera extend outward from the housing 27. The wires are threaded through a port 25 disposed at the bottom wall 24 of the housing 27. The port 25 is cylindrical in shape and extends downward from the bottom wall 24. The port 25 includes an aperture thereon for receiving wires therethrough. In this way, a portion of the wires is disposed in the interior volume of the housing 27, and a remaining portion of the wires is disposed on the exterior of the housing 27.

The housing 27 further comprises an annular member 26 that is constructed to fit around the camera lens. Preferably, the annular member 26 that extends above the surface of the camera lens 23 so as to form a lip around the camera lens 23. Additionally, the inner perimeter of the annular member 26 may be angled toward the center of the camera lens 23. The annular member 26 further comprises a plurality of apertures 28, wherein the apertures 28 are disposed along a perimeter of the annular member 26. The apertures 28 are separated at regular intervals, and are angled towards the camera lens 23. The apertures 28 extend through the housing so that they are in air communication with the interior volume of the housing 27.

The blower assembly further comprises an elongated tube having a proximal end and a distal end. In one embodiment, the tube may comprise a polyurethane tube. The proximal end of the elongated tube is connected to the port 25 of the housing 27 or inserted therethrough, and the distal end of the tube is connected to an air compressor pump. The air compressor pump is adapted to blow air through the tube from the distal end to the proximal end thereof. The blown air then exits the tube from the proximal end, enters the internal volume of the housing 27 and escapes the housing through the apertures 28 at high speed and pressure. Thus, the apertures 28 are in air communication with the elongated tube. Additionally, because the apertures 28 are angled toward the camera lens 23, the air blows onto the surface of the camera lens 23 so as to remove any debris thereon.

In operation, it is contemplated that the housing 27 may be imbedded within the exterior of a vehicle on which the present invention is installed, so that only the camera lens 23 and the annular member 26 are visible from the exterior of the vehicle. Preferably, the present invention is installed on the rear portion of the vehicle, such as the trunk or the rear lift gate or door.

Figure 2:
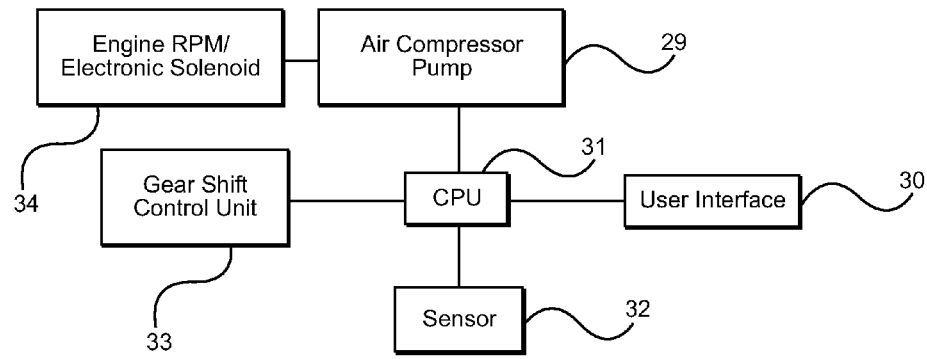
FIG. 2 shows a schematic diagram of the present invention.

Referring now to FIG. 2, there is shown a schematic diagram of the present invention. The present invention comprises an air compressor pump 29 that is connected to the distal end of the tube. In the illustrated embodiment, the air compressor pump 29 is operated or activated via a CPU 31 of a vehicle, and the air compressor pump 29 is driven by a vehicle's engine or an electronic solenoid 34. It is contemplated, however, a PCM, ECM, or TCM may be used in lieu of the CPU. The air compressor pump 29 converts power from the engine or the electronic solenoid 34 into kinetic energy by compressing and pressurizing air, which can travel through the tube and released through the apertures on the annular member disposed on the exterior of the vehicle. Alternatively, the air compressor pump 29 may convert power from a motor, depending upon embodiment. The air compressor pump 29 can be located within the trunk, rear lift gate, or door of the vehicle.

The CPU 31 is in electrical communication with a sensor 32 and a gear shift control unit 33. The sensor 32 may comprise a rain sensor or a similar sensor installed onto a vehicle by manufacturers. Thus, the sensor 32 is the vehicle's integral sensor. The sensor 32 is activated by rainfall, or other debris that falls onto the camera lens. Thus, the sensor 32 can detect whether there are any obstructions such as dirt, moisture, or other types of debris on the camera lens. When the sensor 32 detects debris, the CPU 31 can automatically actuate the air compressor pump 29 to blow air. In some embodiments, the CPU 31 can adjust the speed and force of the blown air depending on the amount of debris detected by the sensor 32. Further, it is contemplated that the sensor 32 may be based on the principle of total internal reflection, wherein an infrared light is beamed at an angle into the camera lens from the interior, and if the lens is dirty, less light makes it back to the sensor 32, and the air compressor pump 29 is actuated.

The gear shift control unit 33 controls the operations in automatic or manual transmissions of a vehicle. The gear shift control unit 33 is adapted to signal the CPU 31 when the driver engages reverse gear within the transmission, permitting the vehicle to be driven backward, and operates a switch to turn on the camera for improved visibility. Signaling the CPU 31 actuates the air compressor pump 29, which is driven by the engine or an electronic solenoid 34 as described above. In some embodiments, the user can control the air compressor pump 29 via a user interface 30 that may be available on the display screen of a dashboard control system of a vehicle, wherein the user interface 30 is in electrical communication with the CPU 31. Thus, the air compressor pump 29 may be activated or controlled even when the sensor 32 does not detect any debris on the camera lens, or when the vehicle is not in a reverse gear.

Figure 3:
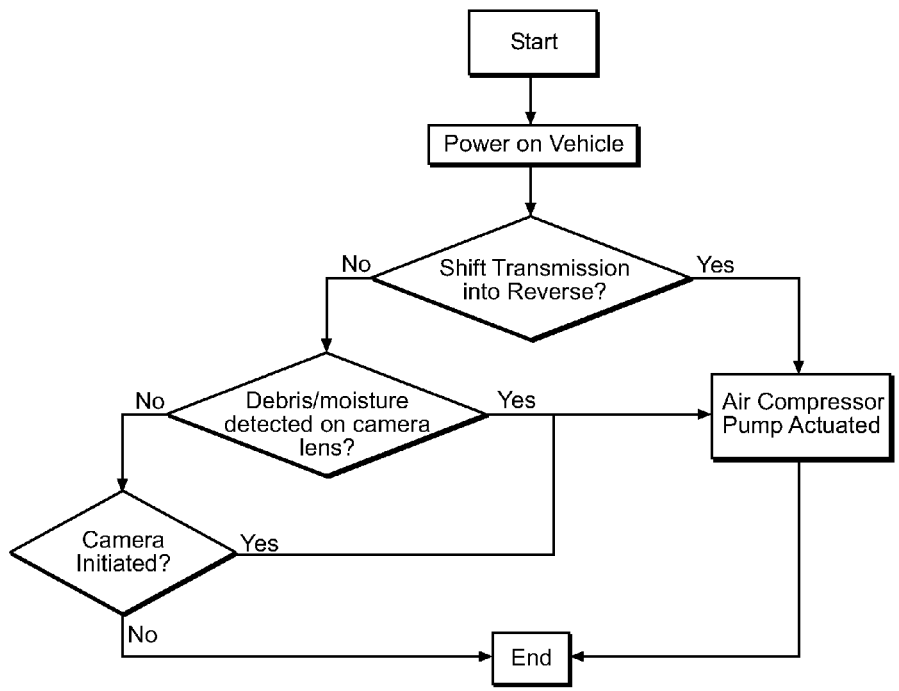
FIG. 3 shows a diagram of the operation procedure of the present invention.

Referring now to FIG. 3, there is shown a diagram of the operation procedure of the present invention. The CPU of the present invention comprises a logic that can carry out the operation procedure of the present invention, which comprises the air blower assembly, the air compressor pump, the engine, the gear shift control unit, the CPU, the user interface, and the sensor. It is contemplated that all of the foregoing components of the present invention are powered via the vehicle's battery. Thus, the present invention is deactivated until the vehicle is on.

The air compressor pump of the present invention is operable when one or more of the following conditions are met. First, the gear shift control unit detects whether the vehicle is in reverse gear within the transmission. If the reverse gear is engaged, air compressor pump is actuated to provide air flow to the camera lens. The air compressor pump may be actuated the entire time the vehicle is in reverse gear. Alternatively, the air compressor pump may be actuated for a predetermined amount of time after the vehicle is in reverse gear, or at regular intervals.

If the gear shift control unit does not indicate that the vehicle is in reverse gear, the sensor determines whether there are any obstructions such as dirt, moisture, or other types of debris on the camera lens. If the sensor detects debris on the camera lens, the air compressor pump is actuated to remove the debris from the camera lens by providing air blow to the same. If the sensor does not detect any debris on the camera lens, the CPU determines whether the camera is initiated, which may be accomplished via the user interface. If the camera is initiated, the air compressor pump is actuated. The above conditions may be met in the order depicted in FIG. 3 or in any order, depending upon embodiment.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above descriptions then, it is to be realized that the optimum dimensional relationships for the parts of the invention, to include variations in size, materials, shape, form, function, and manner of operation, assembly and use, are deemed readily apparent and obvious to one skilled in the art, and all equivalent relationships to those illustrated in the drawings and described in the specifications are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. An automatic camera lens cleaning system, comprising:
    a blower assembly having a housing that is adapted to hold a camera lens on an exterior thereof;
    an annular member disposed around said camera lens;
    a plurality of apertures disposed along a perimeter of said annular member;
    said plurality of apertures in air communication with an interior volume of said housing;
    said interior volume of said housing in air communication with an elongated tube that is connected to an air compressor pump that is operable via a central processing unit;
    said air compressor pump adapted to force air through said tube such that said air exits through said plurality of apertures of said annular member.

2. The automatic camera lens cleaning system of claim 1, wherein said air compressor pump is driven by an engine of a vehicle.

3. The automatic camera lens cleaning system of claim 1, wherein said air compressor pump is driven by an electronic solenoid.

4. The automatic camera lens cleaning system of claim 1, wherein said central processing unit is adapted to operate said air compressor pump when a reverse gear is engaged.

5. The automatic camera lens cleaning system of claim 1, further comprising a sensor that is in electrical communication with said central processing unit;
    wherein said central processing unit operates said air compressor pump when said sensor detects debris on a camera lens.

6. The automatic camera lens cleaning system of claim 1, wherein said air compressor pump can be controlled via a user interface that is electrical communication with said central processing unit.

7. The automatic camera lens cleaning system of claim 1, wherein said plurality of apertures is angled towards said camera lens.

8. The automatic camera lens cleaning system of claim 1, wherein said central processing unit operates said air compressor pump when said camera is initiated.

9. The automatic camera lens cleaning system of claim 1, wherein said central process unit comprises a logic;
    said logic comprising the steps of:
    detecting whether a vehicle is placed in reverse;
    detecting whether debris is present on said camera lens;
    detecting whether said camera is initiated;
    actuating said air compressor pump if said vehicle is placed in reverse, if debris is present on said camera lens, or if said camera is initiated.

* * * * *